(12) United States Patent
Koo et al.

(10) Patent No.: US 10,499,061 B2
(45) Date of Patent: Dec. 3, 2019

(54) METHOD AND DEVICE FOR PROCESSING VIDEO SIGNAL BY USING SEPARABLE GRAPH-BASED TRANSFORM

(71) Applicant: LG Electronics Inc., Seoul (KR)

(72) Inventors: Moonmo Koo, Seoul (KR); Bumshik Lee, Seoul (KR); Sehoon Yea, Seoul (KR); Kyuwoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/744,665

(22) PCT Filed: Jul. 15, 2016

(86) PCT No.: PCT/KR2016/007766
§ 371 (c)(1),
(2) Date: Jan. 12, 2018

(87) PCT Pub. No.: WO2017/010850
PCT Pub. Date: Jan. 19, 2017

(65) Prior Publication Data
US 2018/0213233 A1      Jul. 26, 2018

Related U.S. Application Data

(60) Provisional application No. 62/192,578, filed on Jul. 15, 2015.

(51) Int. Cl.
*H04N 19/146*      (2014.01)
*H04N 19/159*      (2014.01)
(Continued)

(52) U.S. Cl.
CPC ........... *H04N 19/146* (2014.11); *H04N 19/12* (2014.11); *H04N 19/124* (2014.11); *H04N 19/14* (2014.11);
(Continued)

(58) Field of Classification Search
CPC .... H04N 19/146; H04N 19/124; H04N 19/80; H04N 19/159; H04N 19/91
See application file for complete search history.

(56) References Cited

U.S. PATENT DOCUMENTS 7,216,140 B1 *  5/2007  Chen ..................... G06F 17/147
                                                708/607
2005/0226335 A1 * 10/2005  Lee ......................... H04N 19/56
                                                375/240.16
(Continued)

FOREIGN PATENT DOCUMENTS

JP    2014007477      1/2014
KR    20110093532     8/2011
(Continued)

OTHER PUBLICATIONS

Hu et al., "Multiresolution Graph Fourier Transform for Compression of Piecewise Smooth Images", Jan. 2015, IEEE Transactions on Image Processing, vol. 24, No. 1, pp. 419-433 (Year: 2015).*
(Continued)

*Primary Examiner* — Shawn S An
(74) *Attorney, Agent, or Firm* — Fish & Richardson P.C.

(57) ABSTRACT

The present invention provides a method for decoding a video signal by using a graph-based transform, comprising the steps of: parsing a transform index from the video signal; generating a line graph on the basis of edge information on a target unit; aligning transform vectors for each of segments of the line graph on the basis of a transform type corresponding to the transform index; acquiring a transform kernel by realigning the transform vectors for each of segments of the line graph according to a predetermined condition; and performing an inverse transform for the target unit on the basis of the transform kernel.

12 Claims, 18 Drawing Sheets

(51) Int. Cl.
*H04N 19/176* (2014.01)
*H04N 19/513* (2014.01)
*H04N 19/124* (2014.01)
*H04N 19/91* (2014.01)
*H04N 19/80* (2014.01)
*H04N 19/147* (2014.01)
*H04N 19/46* (2014.01)
*H04N 19/12* (2014.01)
*H04N 19/14* (2014.01)

(52) U.S. Cl.
CPC ......... *H04N 19/147* (2014.11); *H04N 19/159* (2014.11); *H04N 19/176* (2014.11); *H04N 19/46* (2014.11); *H04N 19/513* (2014.11); *H04N 19/80* (2014.11); *H04N 19/91* (2014.11)

(56) References Cited

U.S. PATENT DOCUMENTS

2006/0204119 A1* 9/2006 Feng ..................... G06F 17/147
　　　　　　　　　　　　　　　　　　　382/250
2007/0071103 A1* 3/2007 Bi ......................... G06T 3/4084
　　　　　　　　　　　　　　　　　　　375/240.18
2013/0272422 A1* 10/2013 Lee ..................... H04N 19/176
　　　　　　　　　　　　　　　　　　　375/240.18
2014/0254674 A1* 9/2014 Lee ..................... H04N 19/105
　　　　　　　　　　　　　　　　　　　375/240.12

FOREIGN PATENT DOCUMENTS

KR　　20150046353　　4/2015
WO　　　2015009039　　1/2015

OTHER PUBLICATIONS

International Search Report in International Application No. PCT/KR2016/007766, dated Oct. 31, 2016, 11 pages (with partial English translation).

Pavez et al., "GTT: Graph template transforms with applications to image coding," Jun. 2015, Picture Coding Symposium (PCS), University of Southern California, 6 pages.

* cited by examiner

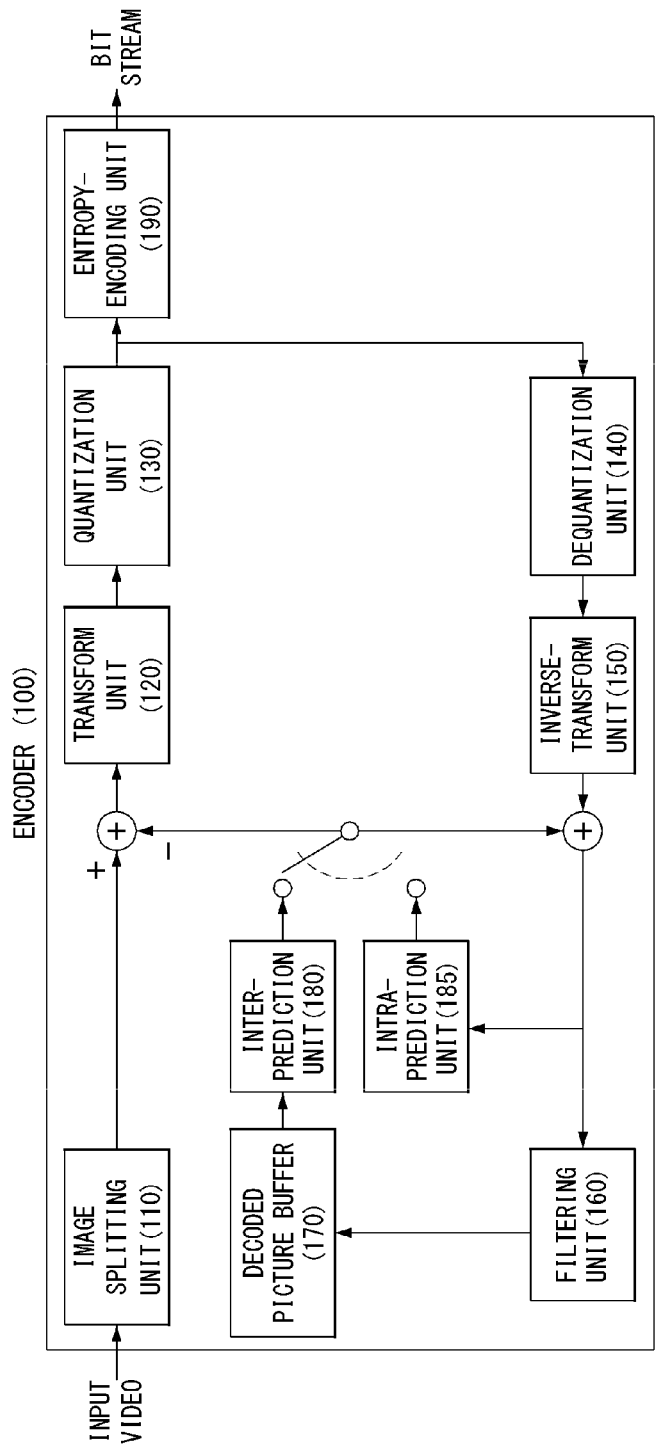
[FIG. 1]

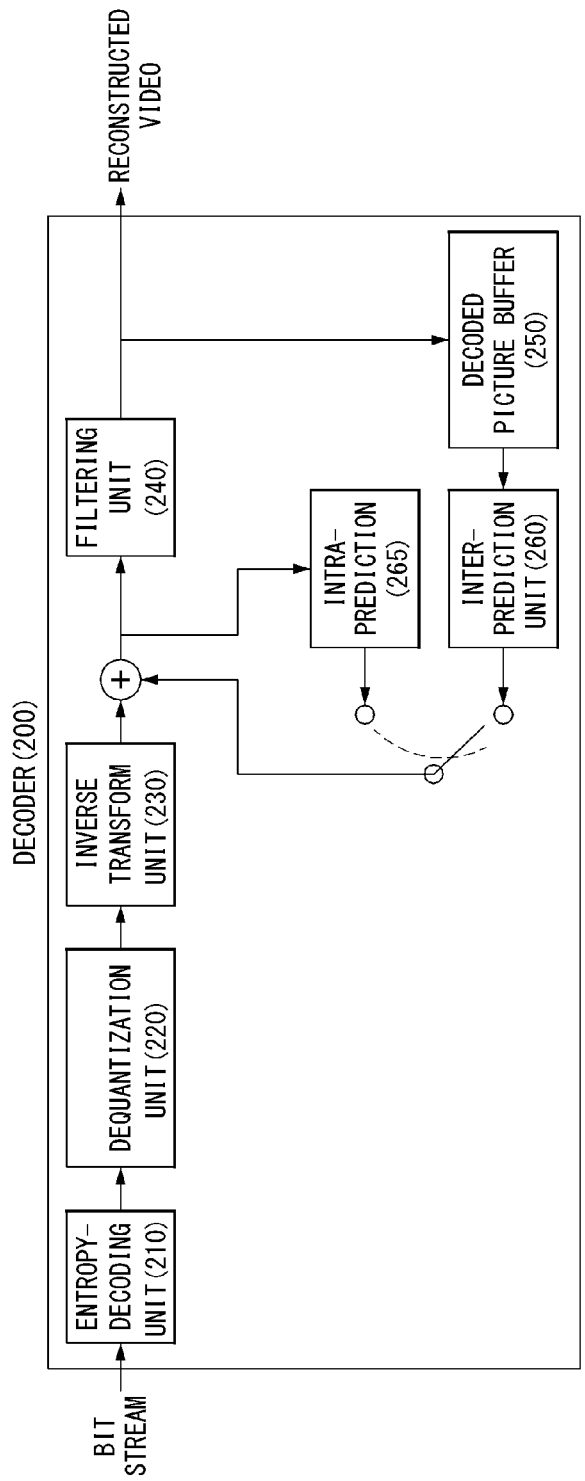
[FIG. 2]

[FIG. 3A]
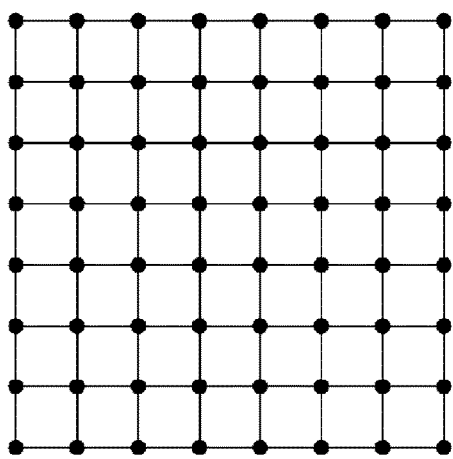
[FIG. 3B]
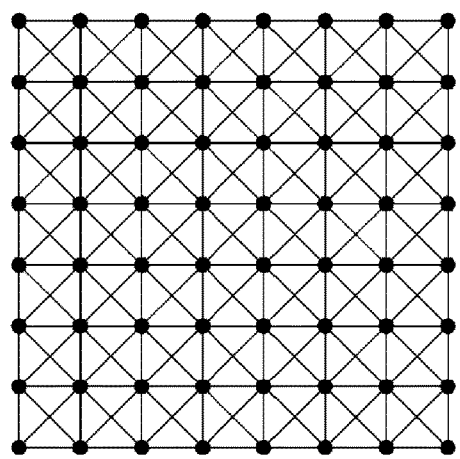

[FIG. 4A]
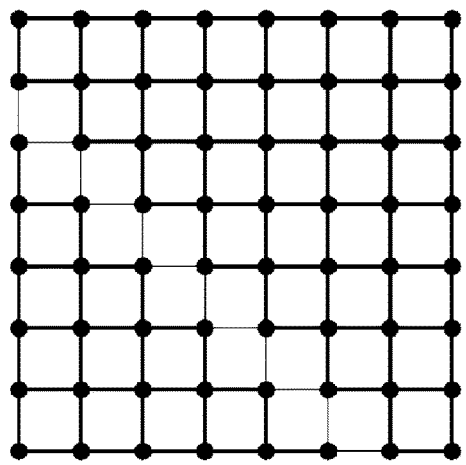
[FIG. 4B]
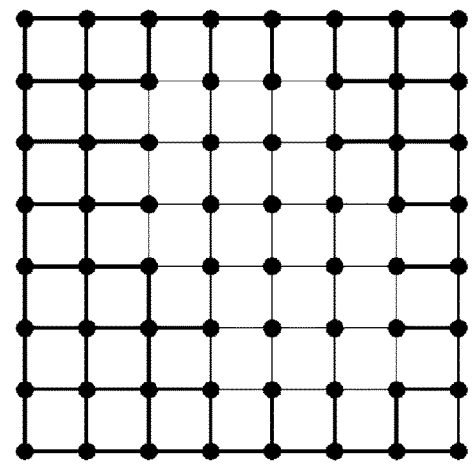

[FIG. 5A]
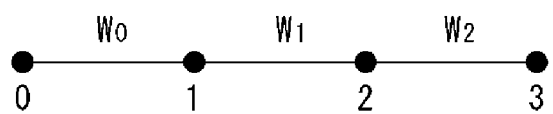
[FIG. 5B]
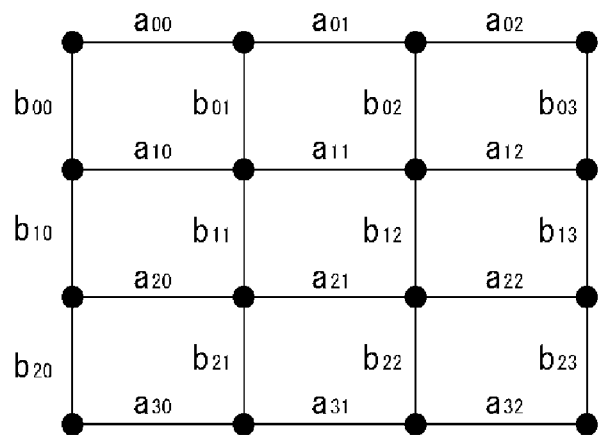

[FIG. 6A] 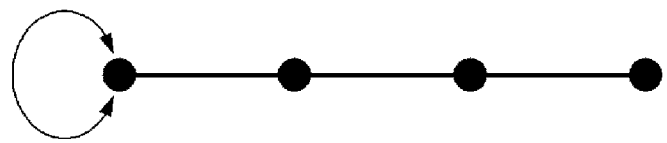
[FIG. 6B] 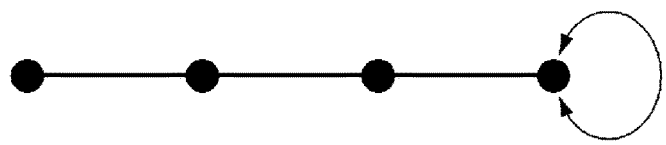
[FIG. 6C] 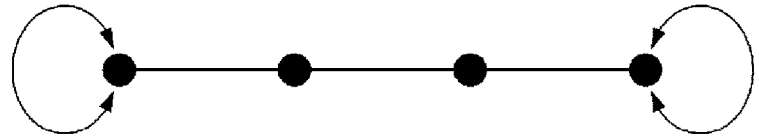
[FIG. 6D] 

[FIG. 7]
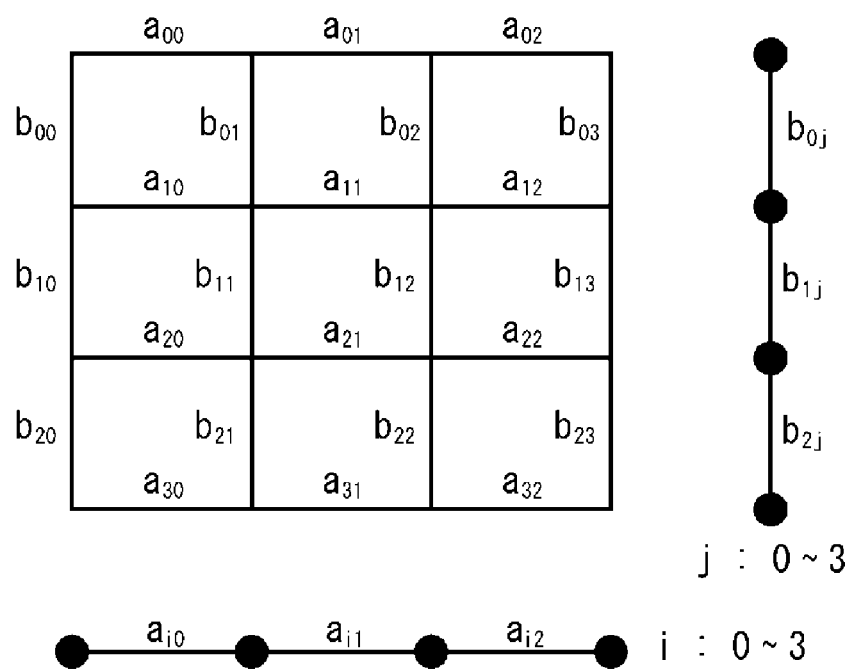

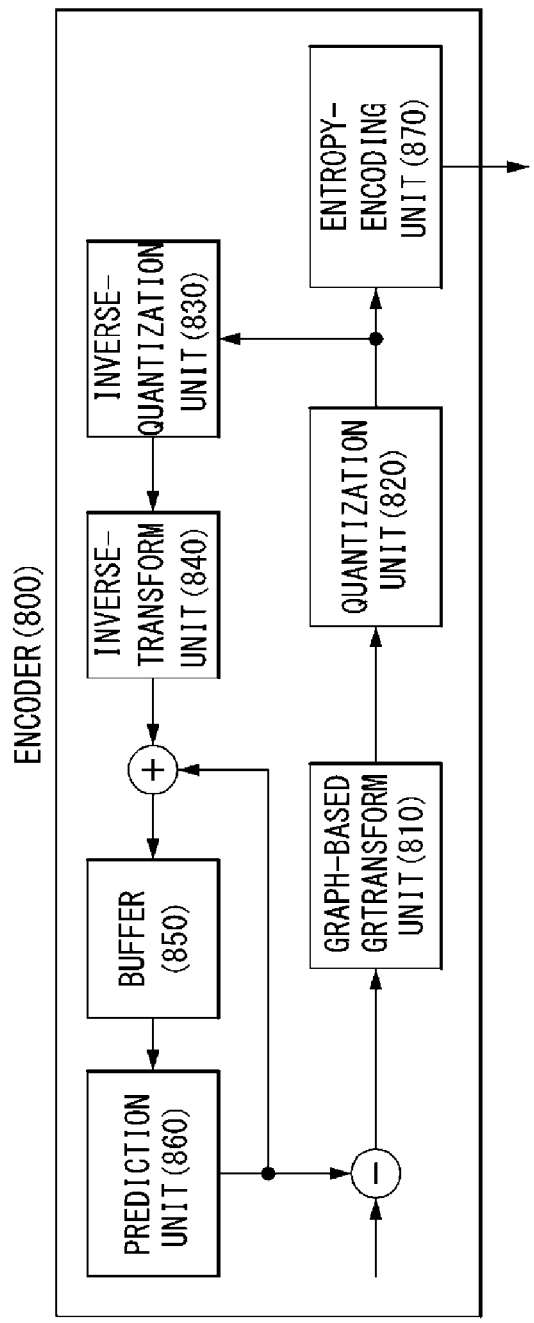
[FIG. 8]

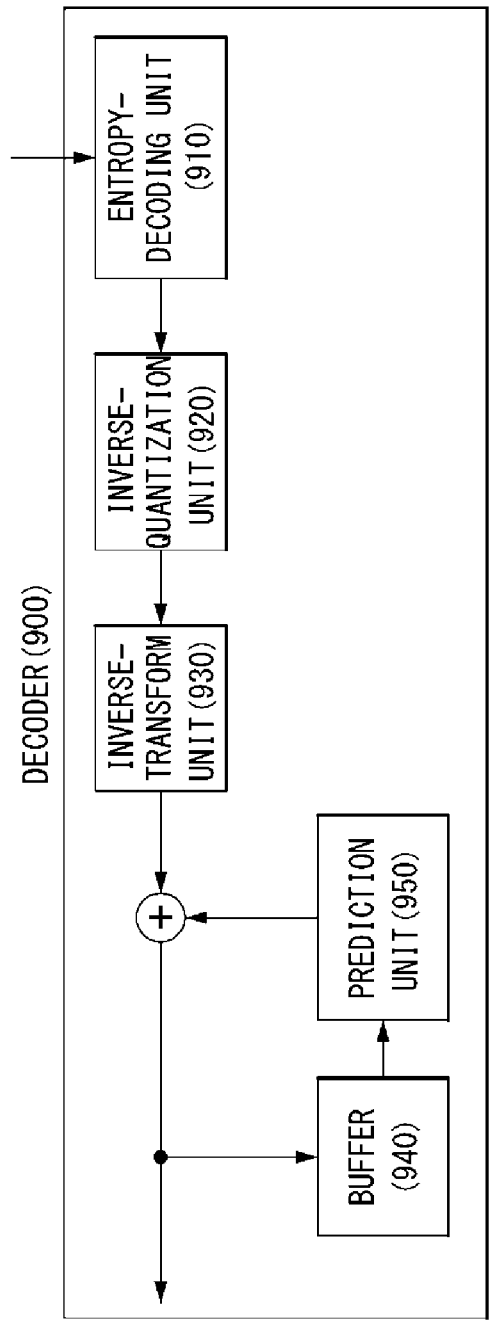
[FIG. 9]

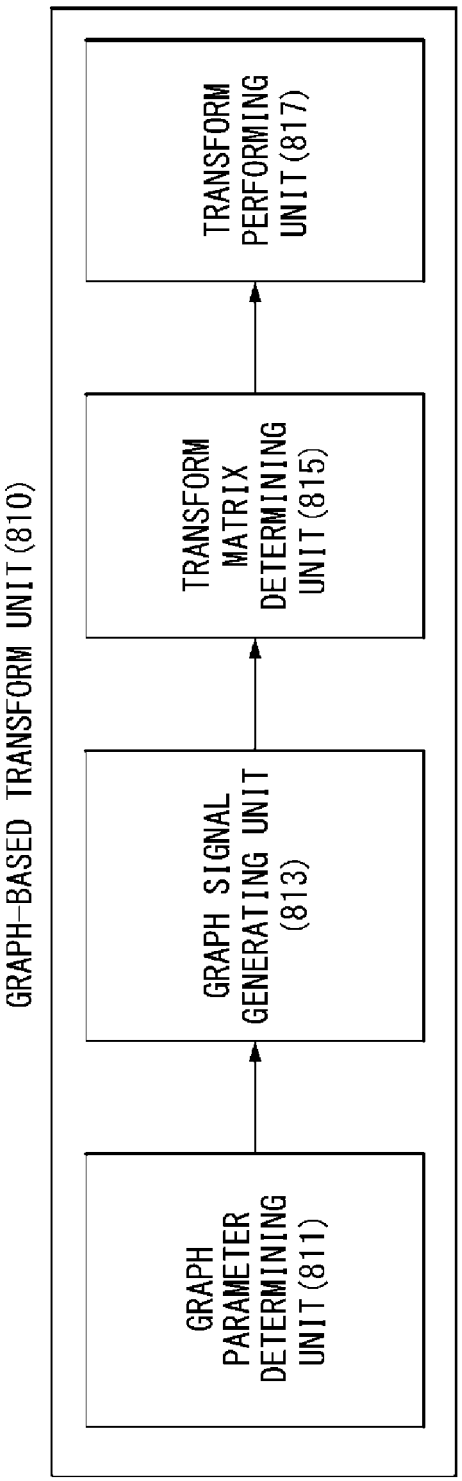
[FIG. 10]

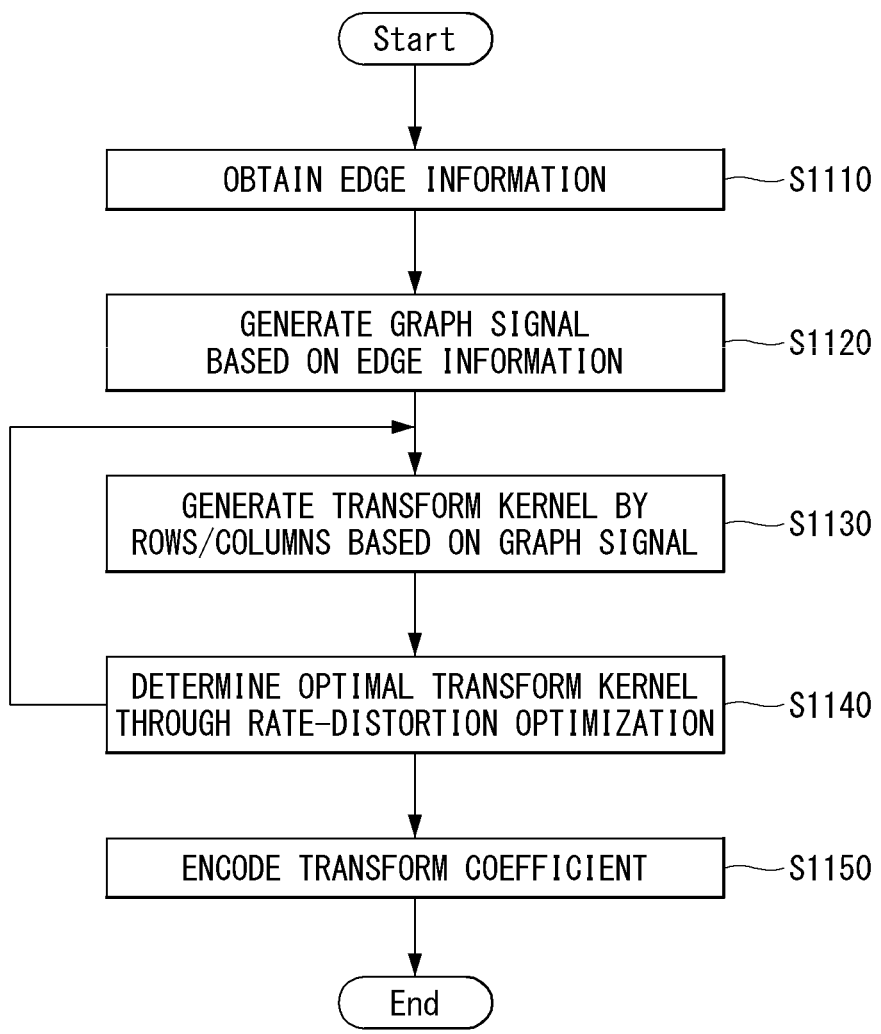

[FIG. 12]
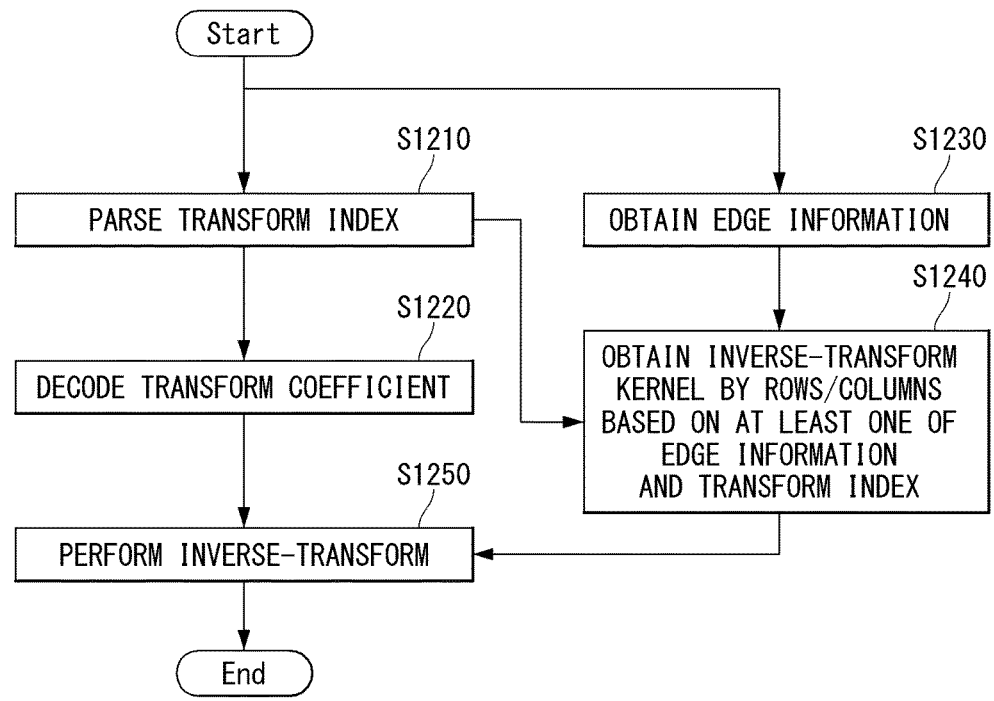

【FIG. 13】
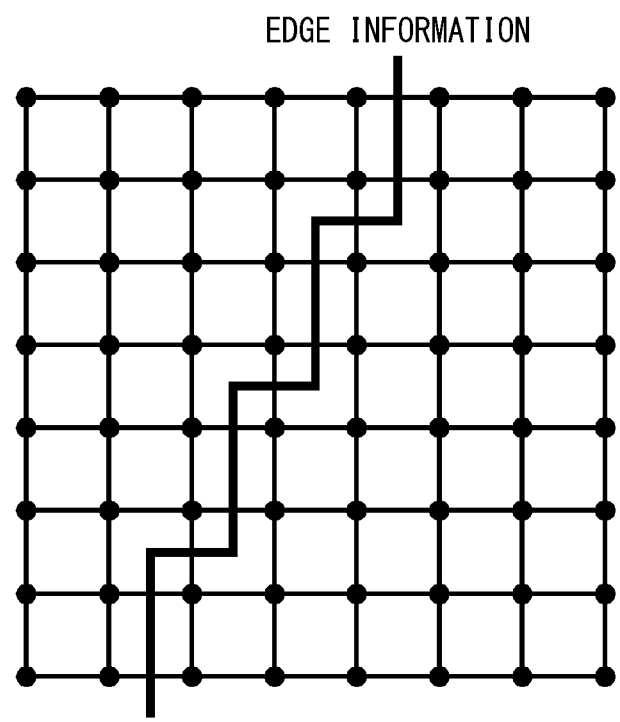

[FIG. 14A]
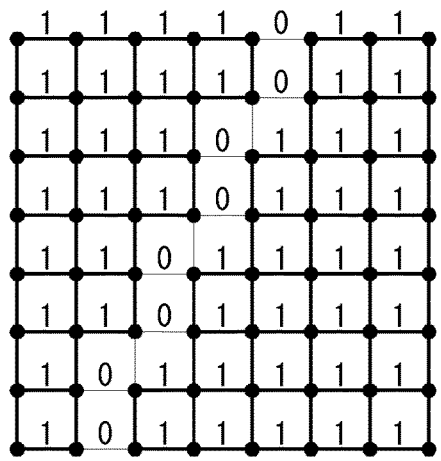
EDGE IN ROW DIRECTION
[FIG. 14B]
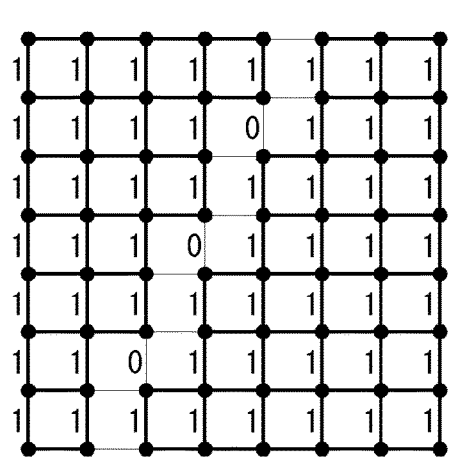
EDGE IN COLUMN DIRECTION 【FIG. 15】
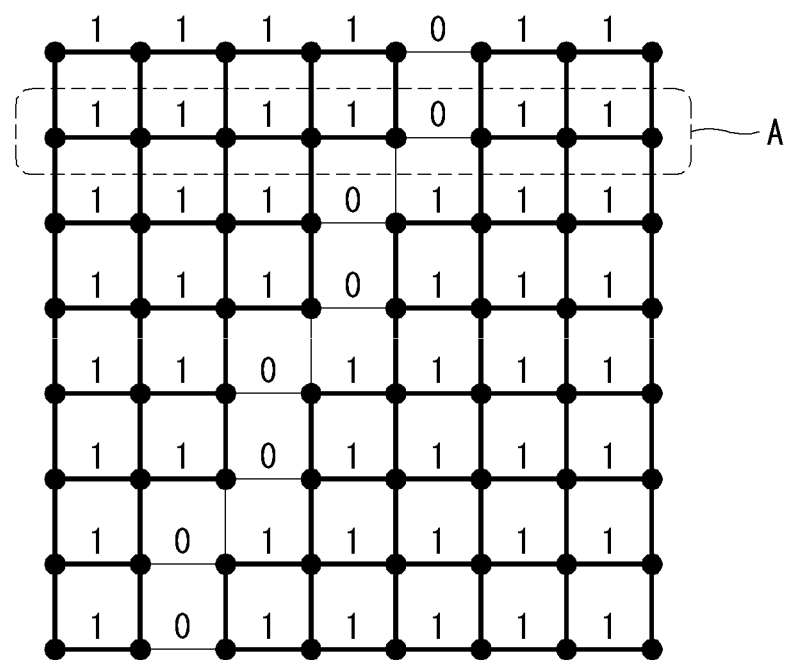

[FIG. 16]
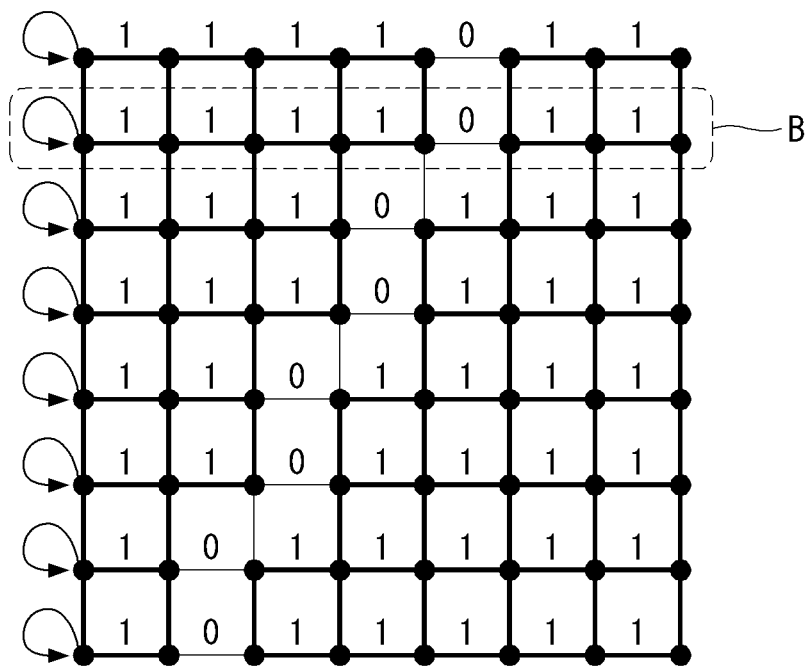

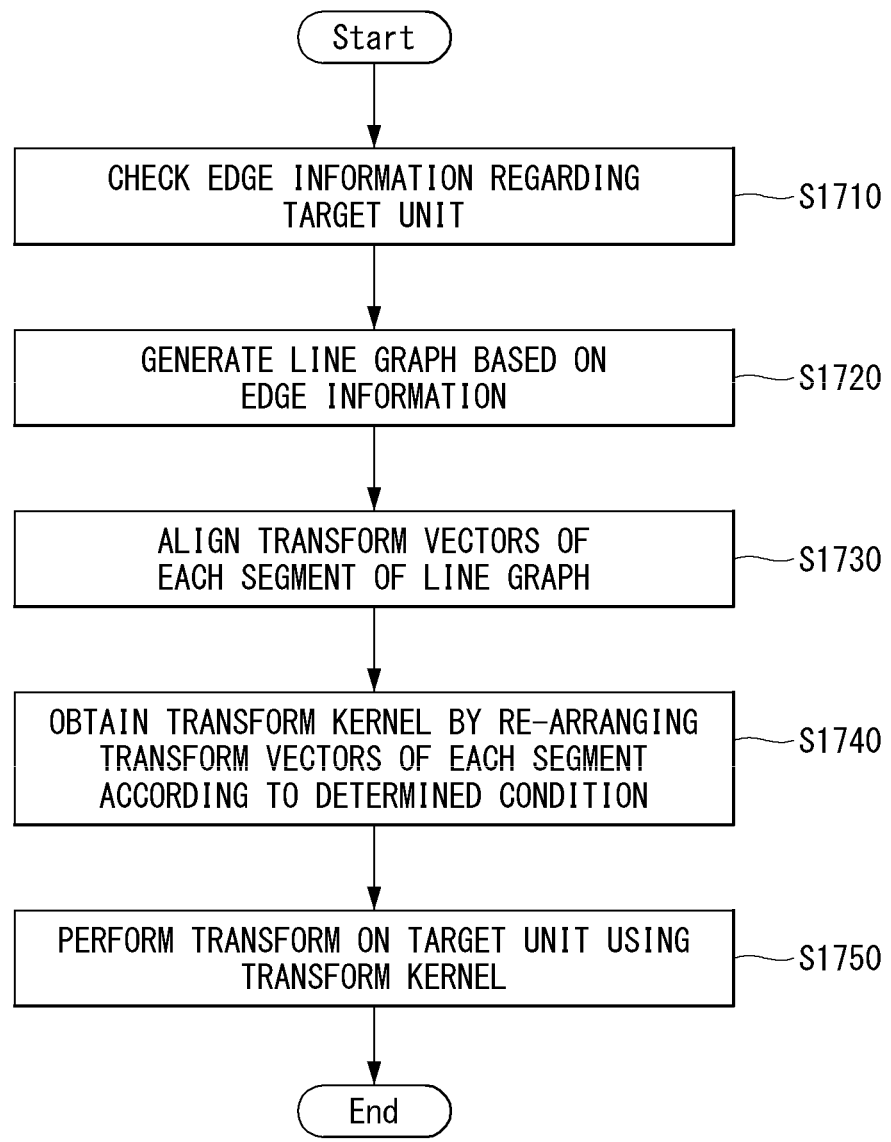

[FIG. 18]
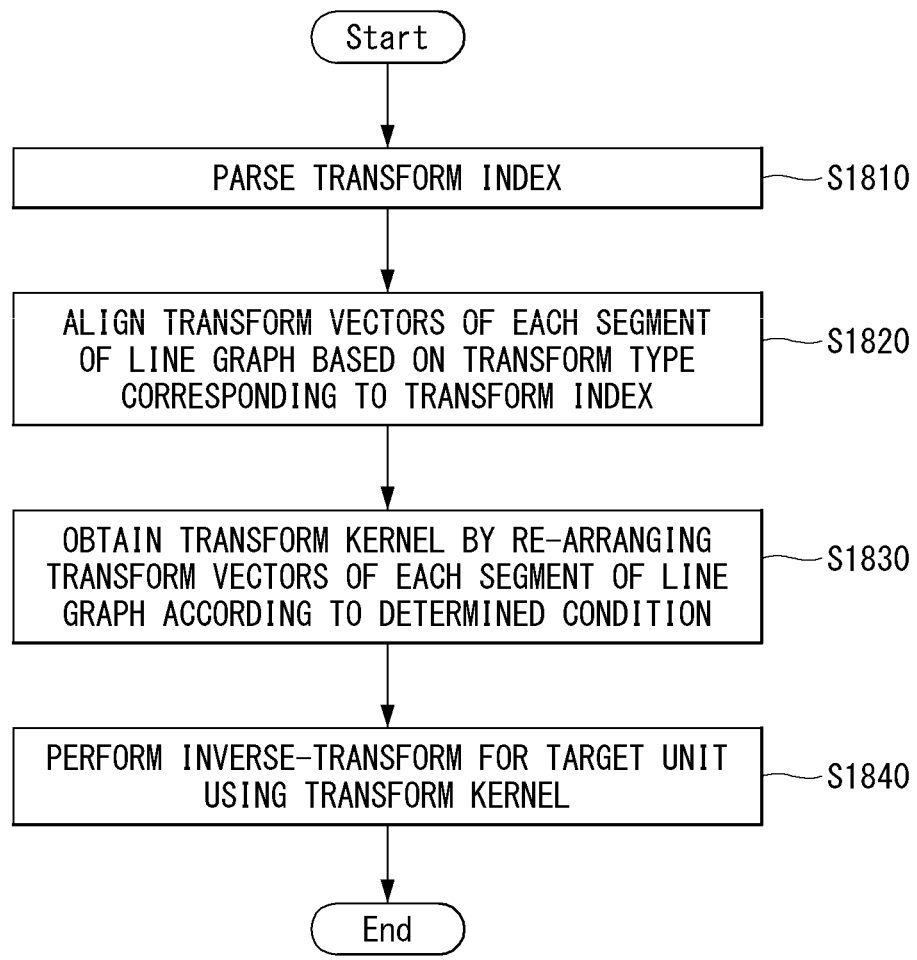

METHOD AND DEVICE FOR PROCESSING VIDEO SIGNAL BY USING SEPARABLE GRAPH-BASED TRANSFORM

CROSS-REFERENCE TO RELATED APPLICATIONS

This application is a National Stage application under 35 U.S.C. § 371 of International Application No. PCT/KR2016/007766, filed Jul. 15, 2016, which claims the benefit of U.S. Application No. 62/192,578, filed on Jul. 15, 2015. The disclosures of the prior applications are incorporated by reference in their entirety.

TECHNICAL FIELD

The present invention relates to a method and device for encoding and decoding a video signal using a separable graph-based transform. More particularly, the present invention relates to a method of generating a graph-based transform kernel by combining transform coefficients of a region divided based on edges.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

In particular, a graph is a data expression form advantageous for describing inter-pixel relation information, and a graph-based signal processing scheme of processing inter-pixel relation information by expressing it as a graph has been utilized. Such graph-based signal processing is based on a graph in which each signal sample represents a vertex and the signal relationships are represented by graph edges with positive weights. Since residual signals have very different statistical properties depending on a prediction method and video content, it is necessary to optimize concepts such as sampling, filtering, transforming, and the like, using graph-based signal processing.

DISCLOSURE

Technical Problem

An aspect of the present invention provides a method of applying graph-based transform adaptive to characteristics of a video signal or a residual signal.

Another aspect of the present invention provides a method of generating a graph-based transform kernel by combining transform coefficients of a region divided based on the edges of a 1-dimensional line graph.

Another aspect of the present invention provides a method of generating a graph from edge information of an image and subsequently generating a transform kernel using the graph.

Another aspect of the present invention provides a method of generating a graph from split information of an image and subsequently generating a transform kernel using the graph.

Another aspect of the present invention provides a method of generating an optimal transform kernel based on graph characteristics of a residual block.

Another aspect of the present invention provides a method of selecting whether to apply general transform (e.g., DCT, DST, etc.) or graph-based transform by transmitting flag information for each image segmentation unit.

Another aspect of the present invention provides a method of defining a transform index corresponding to an optimal transform kernel.

Another aspect of the present invention provides a method of generating a line graph based on at least one of an edge weight, the number of self-loops, and a self-loop weight.

Another aspect of the present invention provides a method of generating a graph-based transform kernel using various types of line graph.

Another aspect of the present invention provides a method of defining a template for graph-based transform based on at least one of an edge weight, the number of self-loops, and a self-loop weight and signaling the template.

Technical Solution

According to an aspect of the present invention, there is provided a method of applying a graph-based transform adaptive to characteristics of a video signal or a residual signal.

According to another aspect of the present invention, there is provided a method of generating a graph from edge information of an image and subsequently generating a transform kernel using the graph.

According to another aspect of the present invention, there is provided a method of generating a graph from split information of an image and subsequently generating a transform kernel using the graph.

According to another aspect of the present invention, there is provided a method of generating an optimal transform kernel based on graph characteristics of a residual block.

According to another aspect of the present invention, there is provided a method of selecting whether to apply general transform (e.g., DCT, DST, etc.) or graph-based transform by transmitting flag information for each image segmentation unit.

According to another aspect of the present invention, there is provided a method of defining a transform index corresponding to an optimal transform kernel.

According to another aspect of the present invention, there is provided a method of generating a line graph based on at least one of an edge weight, the number of self-loops, and a self-loop weight.

According to another aspect of the present invention, there is provided a method of generating a graph-based transform kernel using various types of line graph.

According to another aspect of the present invention, there is provided a method of defining a template for graph-based transform based on at least one of an edge weight, the number of self-loops, and a self-loop weight and signaling the defined template.

Advantageous Effects

According to the present invention, a still image or video is expressed as a graph properly representing characteristics of a video signal and encoding/decoding is performed by applying a transform kernel generated from the corresponding graph, thus significantly reducing an amount of compressed data regarding a complicated image.

According to the present invention, a flexibility in which a transform may be adaptively applied may be secured, an operation complexity may be decreased, a faster adaptation is available for statistical property which is changed in different video segments with each other, and variability may be provided in performing a transform.

In addition, according to the present invention, more efficient coding may be performed by providing a method of applying an adaptive graph-based transform to a property of a video signal or a residual signal.

In addition, according to the present invention, an overhead in a transform matrix transmission and a transform selection may be significantly decreased by defining a transform index corresponding to an optimal transform kernel.

DESCRIPTION OF DRAWINGS

FIG. 1 shows a schematic block diagram of an encoder for encoding a video signal, in accordance with one embodiment of the present invention.

FIG. 2 shows a schematic block diagram of a decoder for decoding a video signal, in accordance with one embodiment of the present invention.

FIGS. 3A and 3B show examples of graphs used for modeling statistical relationships in 8×8 block within a video frame according to an embodiment to which the present invention is applied.

FIGS. 4A and 4B show graphs of two shapes representing weights distribution as an embodiment to which the present invention is applied.

FIGS. 5A and 5B are diagrams for describing a procedure of obtaining a graph-based transform matrix based on 1-dimensional graph and 2-dimensional graph as an embodiment to which the present invention is applied.

FIGS. 6A to 6D are views illustrating 1-dimensional graphs which may become transform bases for applying a separable transform according to an embodiment to which the present invention is applied.

FIG. 7 is a view illustrating a method of applying a different separable transform to each line of a 2-dimension graph according to an embodiment to which the present invention is applied.

FIG. 8 is a schematic block diagram of an encoder which processes a graph-based signal according to an embodiment to which the present invention is applied.

FIG. 9 is a schematic block diagram of a decoder which processes a graph-based signal according to an embodiment to which the present invention is applied.

FIG. 10 is an internal block diagram of a graph-based transform unit according to an embodiment to which the present invention is applied.

FIG. 11 is a flow chart illustrating a method of determining an optimal transform kernel based on edge information of a video signal according to an embodiment to which the present invention is applied.

FIG. 12 is a flow chart illustrating a method of determining a method of determining a separable graph-based transform kernel using a transform index according to an embodiment to which the present invention is applied.

FIGS. 13, 14A, and 14B are views illustrating graph examples for explaining edge information and weight information of an image signal according to embodiments to which the present invention is applied.

FIG. 15 is a view illustrating application of different transform kernels to each row or column in 1-dimensional line graph according to an embodiment to which the present invention is applied.

FIG. 16 is a view illustrating a method of determining an optimal transform kernel based on at least one of the number of self-loops, a self-loop weight, and an edge weight according to an embodiment to which the present invention is applied.

FIG. 17 is a flow chart illustrating a process of rearranging transform vectors constituting a transform kernel based on edge information according to an embodiment to which the present invention is applied.

FIG. 18 is a flow chart illustrating a process of decoding a video signal through a transform vector rearranging process according to an embodiment to which the present invention is applied.

BEST MODES

The present invention provides a method of decoding a video signal using a graph-based transform, including: parsing a transform index from the video signal; generating a line graph based on edge information regarding a target unit; arranging transform vectors for each segment of the line graph based on a transform type corresponding to the transform index; obtaining a transform kernel by rearranging the transform vectors for each segment of the line graph according to a predetermined condition; and performing an inverse-transform for the target unit based on the transform kernel.

In the present invention, the transform kernel may include a combination of transform vectors present in two or more line graph segments divided based on the edge information, and at least two transform types are applied to the transform vectors present in the two or more line graph segments.

In the present invention, when a left segment among the two or more line graph segments based on the edge information is a first segment and a right segment among the two or more line graph segments is a second segment, transform vectors within the first segment and the second segment are arranged in ascending order based on an angular frequency value.

In the present invention, when the angular frequency values of the transform vectors within the first segment and the second segment are the same, priority is given to the line graph segment positioned on the left.

In the present invention, when the angular frequency values of the transform vectors within the first segment and the second segment are the same, priority is given to a wider line graph segment.

In the present invention, when the angular frequency values of the transform vectors within the first segment and the second segment are the same, the transform vectors within the same segment are arranged to become away from each other.

The present invention provides a method of encoding a video signal using a graph-based transform, including: checking edge information for a target unit; generating a line graph based on the edge information; generating a transform kernel for each of rows and columns of the target unit based on the line graph; and performing a transform for the target unit using the transform kernel, wherein the transform kernel includes a combination of transform vectors present in two or more line graph segments divided based on the edge information and at least two transform types are applied to the transform vectors present in the two or more line graph segments.

In the present invention, the method may further include: rearranging the transform vectors constituting the transform kernel according to a predetermined condition.

In the present invention, the method may further include: encoding a transform index corresponding to the transform kernel.

The present invention provides a device for decoding a video signal using a graph-based transform, including: a parsing unit parsing a transform index from the video signal; and an inverse-transform unit generating a line graph based on edge information regarding a target unit, arranging transform vectors for each segment of the line graph based on a transform type corresponding to the transform index, obtaining a transform kernel by rearranging the transform vectors for each segment of the line graph according to a predetermined condition, and performing an inverse-transform for the target unit based on the transform kernel.

The present invention provides a device for encoding a video signal using a graph-based transform, including: a graph signal generating unit checking edge information for a target unit and generating a line graph based on the edge information; a transform matrix determining unit generating a transform kernel for each of rows and columns of the target unit based on the line graph; and a transform performing unit performing a transform for the target unit using the transform kernel, wherein the transform kernel includes a combination of transform vectors present in two or more line graph segments divided based on the edge information and at least two transform types are applied to the transform vectors present in the two or more line graph segments.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Furthermore, partitioning, decomposition, splitting, division may also be properly replaced and interpreted in each coding process.

By applying a linear transform that adaptively modifies the statistical properties of a signal in different parts of a video sequence, compression efficiency may be improved.

General statistical methods have been tried such an object, but they bring a restricted result. The present invention introduces a graph-based signal processing technique as a more efficient method of modeling statistical properties of a video signal for video compression.

In order to simplify mathematical analysis and to use the result known from a graph theory, most of applications developed for the graph-based signal processing uses an undirected graph without self-loop (i.e., there is no edge that connects nodes in itself.), and models with non-negative edge only in each graph edge.

Such an approach may be successfully applied for signaling an image of well defined discontinuity, sharp edge or a depth image. The graphs corresponding to $N^2$ pixel blocks in an image and video application require transmission overhead for $2N^2$ or $4N^2$ non-negative edge weights, generally. After a graph is defined, the orthogonal transform for coding or prediction may be derived by calculating spectral decomposition of a graph Laplacian matrix. For example, through the spectral decomposition, an eigenvector and an eigen value may be obtained.

The present invention provides a graph-based transform kernel by combining transform coefficients of regions formed by dividing a 1-dimensional line graph based on edges. Here, transform obtained from the graph may be defined as graph-based transform (GBT). For example, when information on a relationship between pixels constituting a TU is expressed as a graph, transform obtained from the graph may be called GBT.

Hereinafter, embodiments to which the present invention is applied will be described in detail.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter-prediction unit 180 or the intra-prediction unit 185 may be used to generate the reconstructed signal or used to generate the residual signal.

FIG. 2 shows a schematic block diagram of a decoder for decoding a video signal, in accordance with one embodiment of the present invention.

Referring to FIG. 2, a decoder 200 may include a parsing unit (not shown), an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information. In this case, the obtained transform coefficient may be associated with the operations of the transform unit 120 as described above with reference to FIG. 1.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIGS. 3A and 3B show examples of graphs used for modeling statistical relationships in 8×8 block within a video frame according to an embodiment to which the present invention is applied.

The discrete-time signal processing technique has been developed from directly processing and filtering an analogue signal, and accordingly, has been restricted by a few common assumptions such as sampling and processing regularly organized data only.

Basically, the video compression field is based on the same assumption, but has been generalized for a multi-dimensional signal. The signal processing based on a graph representation generalizes the concepts such as sampling, filtering and Fourier transform, uses the graph that represents a vertex by each signal sample, and is started from the conventional approach in which signal relationships are represented by graph edges with positive weights. This completely isolates a signal from its acquisition process, and accordingly, the properties such as sampling rate and sequence are completely replaced by the properties of a graph. Accordingly, the graph representation may be defined by a few specific graph models.

In the present invention, an undirected simple graph and an undirected edge may be used to represent an empirical connection between data values. Here, the undirected simple graph may mean a graph without self-loop or multiple edges.

When the undirected simple graph that has a weight allocated for each edge is referred to as G, the undirected simple graph G may be described with triplet as represented in Equation 1.

$$G=\{v,\varepsilon,w\} \quad \text{[Equation 1]}$$

Here, V represents V numbers of graph vertex set, ε represents a graph edge set, and W represents a weight represented as V×V matrix. Here, weight W may be represented as Equation 2 below.

$$W_{i,j}=W_{j,i}\geq 0 \quad \text{[Equation 2]}$$

$W_{i,j}$ represents a weight of edge (i, j), and $W_{j,i}$ represents a weight of edge (j, i). When there is no edge connecting vertex (i, j), $W_{i,j}=0$. For example, in the case of assuming that there is no self-loop, $W_{i,i}=0$, always.

The representation is partially overlapped for a special case of the undirected simple graphs that have an edge weight. This is because matrix W includes all types of information of the graph. Accordingly, in the present invention, hereinafter, a graph is represented as G(W).

Meanwhile, referring to FIGS. 3A and 3B, the present invention provides two embodiments of graph types that may be used for processing 8×8 pixel blocks in an image or a video. Each pixel is in relation to a graph vertex, and the pixel value becomes the value of the graph vertex.

A graph edge may mean a line connecting graph vertexes. The graph edge is used for representing a certain type of statistical dependency within a signal, and in this case, a positive weigh may represent the sharpness. For example, each vertex may be connected to all of other vertexes, and weight of 0 may be allocated to an edge that connects vertexes not coupled with each other or weakly coupled. However, for simplifying the representation, the edge having the weight of 0 may be completely removed.

In the graph shown in FIG. 3A, a graph edge may be defined such that each vertex is connected to the nearest 4 adjacent vertexes. However, a block edge may be differently treated. In addition, in the graph shown in FIG. 3B, it may be defined that each vertex is connected to the nearest 8 adjacent vertexes.

FIGS. 4A and 4B show a graph of two shapes representing weights distribution as an embodiment to which the present invention is applied.

The vertex value of a graph is an independent variable based on a signal measurement (normally, modeled as an arbitrary variable), but it is required to select an edge weight in accordance with the property of a part of signal. FIGS. 4A and 4B show two exemplary graphs that represent the edge weights of different lines for a graph edge. For example, the bold lines may represent the weight of w=1, and the fine lines may represent the weight of w=0.2.

The graph shown in FIG. 4A represents the case of having "weak link" along a straight line, and represents the case of having two types of edge weights only. Here, the "weak link" means having relatively small edge weight.

This is commonly used in a graph-based image processing actually, and such a construction may represent a difference between an edge in an image and a pixel statistics between different sides.

FIG. 4B represents a distribution of an edge weight that covers irregular area. The present invention is to provide a method of processing a signal using such a distribution graph of an edge weight.

FIGS. 5A and 5B are diagrams for describing a procedure of obtaining a graph-based transform matrix based on 1-dimensional graph and 2-dimensional graph as an embodiment to which the present invention is applied.

As an embodiment of the present invention, the graph type that may be used for processing a pixel block in an image may be described using FIGS. 5A and 5B. For example, FIG. 5A shows 1-dimensional graph that corresponds to each line in the pixel block, and FIG. 5B shows 2-dimensional graph that corresponds to the pixel block.

A graph vertex is in relation to each pixel of the pixel block, and a value of the graph vertex may be represented as a pixel value. And, a graph edge may mean a line connecting the graph vertexes. The graph edge is used for representing a certain type of statistical dependency in a signal, and the value representing its sharpness may be referred to as an edge weight.

For example, FIG. 5A shows a 1-dimensional graph, 0, 1, 2 and 3 represents the position of each vertex, and $w_0$, $w_1$ and $w_2$ represent the edge weight between vertexes. FIG. 5B shows a 2-dimensional graph, and $a_{ij}$ (i=0,1,2,3,j=0,1,2) and $b_{kl}$ (k=0,1,2,l=0,1,2,3) represent the edge weight between vertexes.

Each vertex may be connected to all of other vertexes, and weight of 0 may be allocated to an edge that connects vertexes not coupled with each other or weakly coupled. However, for simplifying the representation, the edge having the weight of 0 may be completely removed.

The relationship information between pixels may be represented as whether there is an edge between pixels and an edge weight when each pixel is mapped to a vertex of a graph.

In this case, GBT may be obtained through the following procedures. For example, an encoder or a decoder may obtain graph information from a target block of a video signal. From the obtained graph information, Laplacian matrix L may be obtained as represented in Equation 3 below.

$$L=D-A \quad \text{[Equation 3]}$$

In Equation 3 above, D represents a degree matrix. For example, the degree matrix may mean a diagonal matrix including the information of a degree of each vertex. A represents an adjacency matrix that represents the interconnection (for example, edge) with an adjacent pixel by a weight.

And, with respect to the Laplacian matrix L, a GBT kernel may be obtained by performing an eigen decomposition as represented in Equation 4 below.

$$L=U\Lambda U^T \quad \text{[Equation 4]}$$

In Equation 4 above, L means a Laplacian matrix L, U means an eigen matrix, and $U^T$ means a transposed matrix of U. In Equation 4, the eigen matrix U may provide a graph-based Fourier transform specialized for a signal suitable for the corresponding model. For example, the eigen matrix U that satisfies Equation 4 may mean a GBT kernel.

FIGS. 6A-6D are views illustrating 1-dimensional (1D) graphs which may become transform bases for applying a separable transform according to an embodiment to which the present invention is applied.

Embodiments regarding 1D graphs which may become a base for one line may be described as follows.

In a first embodiment, correlation regarding one pixel pair is so small that a weight value of a corresponding edge may be set to be small. For example, a pixel pair including a block boundary may have relatively small correlation, so a small edge weight may be set for a graph edge including a block boundary.

In a second embodiment, a self-loop may be present or not at both ends, or self-loop may be present only at one end. For example, FIGS. 6A and 6B illustrates the case where the self-loop is present only at one of both ends, FIG. 6C illustrates the case where the self-loop is present at both ends of the graph, and FIG. 6D illustrates the case where the self-loop is not present at both ends of the graph. Here, the self-loop, representing dependency with an adjacent vertex, may refer to self-weight, for example. That is, a weight may be further given to a portion where the self-loop is present.

In another embodiment of the present invention, an extra 1D separable transform set may be defined according to TU sizes. In the case of non-separable transform, transform coefficient data is increased to $O(N^4)$ as a TU size is increased, but in the case of the separable transform, the transform coefficient data is increased to $O(N^2)$. Thus, the following configuration may be formed by combining several 1D separable transforms forming a base.

For example, as a 1D separable transform template, a template in which the self-loop is present on the left as illustrated in FIG. 6A, a template in which the self-loop is present on the right as illustrated in FIG. 6B, a template in which the self-loop is present at both ends as illustrated in FIG. 6C, and a template in which the self-loop is not present on both sides as illustrated in FIG. 6D, may be provided. When these templates are all available, the four cases may be possible in rows and columns, and thus, template indices for a total of 16 combinations may be defined.

In another embodiment, in case where a partition boundary or an object boundary is present in the middle of a TU, a template index may be signaled and a separate template in which a small weight value is additionally given only to an edge corresponding to a boundary may be applied instead.

FIG. 7 is a view illustrating a method of applying a different separable transform to each line of a 2-dimensional (2D) graph according to an embodiment to which the present invention is applied.

FIG. 7 illustrates 2D graph corresponding to a pixel block, in which a graph vertex is associated with each pixel of the pixel block, and a value of the graph vertex may be expressed as a pixel value. Here, the line connecting the graph vertices refers to a graph edge. As discussed above, the graph edge is used to indicate statistical dependency in a certain form within a signal, and a value indicating strength thereof may be called an edge weight. For example, referring to FIG. 7, a 2D graph is illustrated in which au (i=0,1,2,3,j=0,1,2), $b_{kl}$ (k=0,1,2,l=0,1,2,3) indicate an edge weight between vertices.

In an embodiment to which the present invention is applied, in the case of a 2D graph connecting graph edges only for pixels neighboring in a right angle direction (which may also be called a 4-connected graph), 2D NSGBT (non-separable GBT) may be applied but a 1D SGBT (separable GBT) may be applied to a row direction and a column direction.

For example, since each vertex of the 2D graph of FIG. 7 has a maximum of four neighboring vertices, the graph may be a 4-connected graph, and here, a 2D NSGBT (non-separable GBT) kernel may be generated and applied by using an edge weight ($a_{ij}$, $b_{kl}$) of each side.

In a specific example, in the row direction, 1D SGBT (separable GBT) for the graph including edge weights of $a_{i0}$, $a_{i1}$, $a_{i2}$ of an ith row is applied to each column, and regarding each column, 1D SGBT (separable GBT) regarding a graph including edge weights of $b_{0j}$, $b_{1j}$, $b_{2j}$ of a jth column may be applied to each row.

In another example, in the case of an arbitrary 4-connected graph, different 1D SGBT (separable GBT) may be applied to each line (in both a horizontal direction and a vertical direction). For example, in case where combinations of edge weights for each of column and row are different in FIG. 7, 1D SGBT for each combination may be applied.

Meanwhile, in case where a GBT template set for a N×N TU includes M number of 4-connected graphs, a total of M number of $N^2 \times N^2$ transform matrices should be prepared, increasing a memory demand for storing the transform matrices. Thus, if one 4-connected graph may be combined to at least one 1D graph element so as to be configured, only transform for the at least one 1D graph element is required, and thus, a memory amount for storing the transform matrices may be reduced.

In an embodiment of the present invention, various 4-connected 2D graphs may be generated by a limited number of 1D graph elements, whereby a GBT template set appropriate for each mode combination may be customized. Although a total number of GBT templates is increased, the number of 1D transforms forming the base may remain as is, and thus, a required amount of memory may be minimized. For example, combinations of a limited number of ($a_{i0}$, $a_{i1}$, $a_{i2}$) and ($b_{0j}$, $b_{1j}$, $b_{2j}$) may be prepared and appropriately connected in units of 1D graphs for each combination to generate one 4-connected 2D graph.

For example, regarding a current coding block, if graph edge information, partition information, inter-pixel correlation information, and the like, may be received from a bit stream or derived from surrounding information, combinations of 1D transforms may be customized using these information.

FIG. 8 is a schematic block diagram of an encoder which processes a graph-based signal according to an embodiment to which the present invention is applied.

Referring to FIG. 8, an encoder 800 to which the present invention is applied includes a graph-based transform unit 810, a quantization unit 820, a transform-quantization unit 830, an inverse-transform unit 840, a buffer 850, a prediction unit 860, and an entropy-encoding unit 870.

The encoder 800 receives a video signal and subtracts a predicted signal output from the prediction unit 860 from the video signal to generate a prediction error. The generated prediction error is transmitted to the graph-based transform unit 810, and the graph-based transform unit 810 generates a transform coefficient by applying a transform scheme to the prediction error.

In another embodiment to which the present invention is applied, the graph-based transform unit 810 may compare an obtained graph-based transform matrix with the transform matrix obtained from the transform unit 120 of FIG. 1 and select a more appropriate transform matrix.

The quantization unit 820 quantizes the generated transform coefficient and transmits the quantized coefficient to the entropy-encoding unit 820.

The entropy-encoding unit 820 performs entropy encoding on the quantized signal and outputs an entropy-coded signal.

The quantized signal output from the quantization unit 820 may be used to generate a predicted signal. For example, the inverse-quantization unit 830 within the loop of the encoder 800 and the inverse-transform unit 840 may perform inverse-quantization and inverse-transform on the quantized signal such that the quantized signal may be reconstructed to a prediction error. The reconstructed signal may be generated by adding the reconstructed prediction error to the predicted signal output from the prediction unit 860.

The buffer 850 stores a reconstructed signal for a future reference of the prediction unit 860.

The prediction unit 860 may generate a predicted signal using a signal which was previously reconstructed and stored in the buffer 850. The generated predicted signal is subtracted from the original video signal to generate a residual signal, and the residual signal is transmitted to the graph-based transform unit 810.

FIG. 9 is a schematic block diagram of a decoder which processes a graph-based signal according to an embodiment to which the present invention is applied.

A decoder 900 of FIG. 9 receives a signal output from the encoder 800 of FIG. 8.

An entropy decoding unit 910 performs entropy-decoding on a received signal. The inverse-quantization unit 920 obtains a transform coefficient from the entropy-decoded signal based on a quantization step size.

The inverse-transform unit 930 performs inverse-transform on a transform coefficient to obtain a residual signal. Here, the inverse-transform may refer to inverse-transform for graph-based transform obtained from the encoder 800.

The obtained residual signal may be added to the predicted signal output from the prediction unit 950 to generate a reconstructed signal.

The buffer 940 may store the reconstructed signal for future reference of the prediction unit 950.

The prediction unit 950 may generate a predicted signal based on a signal which was previously reconstructed and stored in the buffer 940.

FIG. 10 is an internal block diagram of a graph-based transform unit according to an embodiment to which the present invention is applied.

Referring to FIG. 10, the graph-based transform unit 810 may include a graph parameter determining unit 811, a graph signal generating unit 813, a transform matrix determining unit 815, and a transform performing unit 817.

The graph parameter determining unit 811 may extract a graph parameter of a graph corresponding to a target unit of a video signal or a residual signal. For example, the graph parameter may include at least one of a vertex parameter and an edge parameter. The vertex parameter may include at least one of a vertex position and the number of vertices, and the edge parameter may include at least one of an edge weight value and the number of edge weights. Also, the graph parameter may be defined to a predetermined number of sets.

According to an embodiment of the present invention, a graph parameter extracted from the graph parameter determining unit 811 may be expressed as a generalized form.

The graph signal generating unit 813 may generate a graph signal based on a graph parameter extracted from the graph parameter determining unit 811. Here, the graph signal may include a line graph to which a weight is applied or a weight is not applied. The line graph may be generated for each of a row or column of a target block.

The transform matrix determining unit 815 may determine a transform matrix appropriate for the graph signal. For example, the transform matrix may be determined based on rate distortion (RD) performance. Also, in this disclosure, the transform matrix may be replaced with an expression of transform or a transform kernel so as to be used.

In an embodiment of the present invention, the transform matrix may be a value already determined in the encoder or the decoder, and here, the transform matrix determining unit 815 may be derived from a place where the transform matrix appropriate for the graph signal is stored.

In another embodiment of the present invention, the transform matrix determining unit 815 may generate a 1D transform kernel for a line graph, and generate a 2D separable graph-based transform kernel by combining two of 1D transform kernels. The transform matrix determining unit 815 may determine a transform kernel appropriate for the graph signal among the 2D separable graph-based transform kernels based on the RD performance.

The transform performing unit 817 may perform transform using the transform matrix obtained from the transform matrix determining unit 815.

In this disclosure, functions are sub-divided and described to describe a process of performing graph-based transform, but the present invention is not limited thereto. For example, the graph-based transform unit 810 may include a graph signal generating unit and a transform unit, and here, a function of the graph parameter determining unit 811 may be performed in the graph signal generating unit, and functions of the transform matrix determining unit 815 and the transform performing unit 817 may be performed in the transform unit. Also, a function of the transform unit may be divided into a transform matrix determining unit and a transform performing unit.

FIG. 11 is a flow chart illustrating a method of determining an optimal transform kernel based on edge information of a video signal according to an embodiment to which the present invention is applied.

In an embodiment of the present invention, an encoder may generate or design a line graph. The encoder may generate a 1D graph-based transform (GBT) associated with the line graph, and in this case, the 1D GBT may be generated by using a generalized Laplacian operator.

Here, assuming that there are an adjacent matrix A and a graph G(A) defined thereof, the Laplacian matrix L may be obtained through Equation 5 below.

$$L = D - A + S \qquad \text{[Equation 5]}$$

In Equation 5 above, D represents a degree matrix, and for example, the degree matrix may mean a diagonal matrix that includes information of degree of each vertex. A represents an adjacency matrix that represents a connection relation (e.g., an edge) with an adjacent pixel as a weight. S represents a diagonal matrix that represents a self-loop in the nodes in G.

In addition, for the Laplacian matrix L, an optimal transform kernel may be obtained by performing an eigen decomposition as represented in Equation 6 below.

$$L = U \Lambda U^T \qquad \text{[Equation 6]}$$

In Equation 6 above, L means a Laplacian matrix L, U means an eigen matrix, and $U^T$ means a transposed matrix of U. In Equation 6, the eigen matrix U may provide a graph-based Fourier transform specialized for a signal suitable for the corresponding model. For example, the eigen matrix U that satisfies Equation 6 may mean a GBT kernel.

Here, the columns of the eigen matrix U may mean basis vectors of the GBT. When a graph does not have a self-loop, a generalized Laplacian matrix is as represented as Equation 3 above.

An embodiment of the present invention provides a method of generating an optimal transform kernel according to characteristics of a video signal or a residual signal.

First, an encoder receives a video signal and subtracts a predicted signal output from a prediction unit from the video signal to generate a residual signal (or a prediction error).

The residual signal may be transmitted to a graph-based transform unit, and the graph-based transform unit may generate a graph signal according to characteristics of the video signal or the residual signal. Here, the characteristics of the video signal or the residual signal may be represented by boundary information, and, for example, the boundary information may include at least one of an edge weight, the number of self-loops, and a self-loop weight. Here, the number of the self-loops may refer to the number of the self-loops or positions of the self-loops. In the present disclosure, the number of the self-loops is described but it may be expressed as positions of the self-loops as a substitute.

In a specific example, the encoder may obtain edge information from the residual signal (S1110). For example, the edge information may refer to an edge weight for a transform unit TU.

In the case of transmitting the edge information to a decoder through a bit stream, a separate coding tool for efficiently coding the edge information separately from the block diagrams of FIGS. 1, 2, 8, and 9 may be required. In this case, a block corresponding to the coding tool will be added to the block diagram. In the present invention, however, a method of coding edge information is not described and it is assumed that all edge weight values are determined by any method.

The edge information may be transmitted to the graph-based transform unit, and the graph-based transform unit may generate a graph based on the edge information (S1120). The edge information may be derived from neighboring block information or preset edge information may be retrieved. Therefore, if a decoder may derive the edge information in the same manner, the edge information may not be transmitted.

The encoder may generate a transform kernel for each row and column based on the graph (S1130).

In another embodiment of the present invention, the encoder may derive a predetermined transform kernel using the graph. Here, the transform kernel may correspond to one of preset values, and in this case, the encoder and the decoder know the preset values and may store them in a table, for example. Also, the transform kernel may be defined for each row or column of a target block.

The encoder may determine an optimal transform kernel through rate-distortion optimization (S1140).

A method of generating a transform kernel is described in detail herein, and although the same edge information is used according to applied basic kernel types (e.g., DCT type 2, DST type 7, etc.), several types of transform kernel may be generated. Accordingly, step S1140 may be added, and if only one type of transform kernel is used, step S1140 and a feedback process may be omitted.

Then, the encoder may perform transform on the residual signal using the optimal transform kernel and encode a transform coefficient (S1150).

Meanwhile, in an embodiment of the present invention, a transform index corresponding to the optimal transform kernel may be set, and the transform index may be encoded and transmitted to the decoder. If only one kind of transform kernel is used, coding of additional information such as a transform index may be unnecessary.

FIG. 12 is a flowchart illustrating a method of determining a separable graph-based transform kernel using a transform index according to an embodiment of the present invention.

FIG. 12 illustrates an example of a decoding process.

First, the decoder may parse a transform index regarding a target block from a video signal (S1210). Here, the transform index indicates graph-based transform to be applied to the target block. For example, the graph-based transform to be applied to the target block may refer to a 1-dimensional transform kernel for each row or column. The step S1210 may be performed in a parsing unit of the decoder.

In one embodiment of the present invention, the transform index may be received for each of at least one of a coding unit, a prediction unit or a transform unit.

The encoder or the decoder to which the present invention is applied knows a variety of transform types, and here, each transform type may be mapped to a transform index.

In an embodiment of the present invention, the transform index may be determined based on at least one of the prediction mode and a size of the transform unit. For example, the transform index may be configured in different combinations based on at least one of the prediction mode and the size of the transform unit. That is, different graph-based transform kernels may be applied depending on the prediction mode or the size of the transform unit.

In another embodiment of the present invention, when the target block includes M or N number of subblocks partitioned in a horizontal direction or a vertical direction, the transform index may correspond to each subblock.

In another embodiment of the present invention, the graph-based transform may be derived for each sub-block according to the transform index, and different transform types may be applied to at least two or more sub-blocks. For example, the different transform types may include at least two of DCT, DST, asymmetric discrete sine transform (ADST), and reverse ADST (RADST).

In another embodiment of the present invention, the graph-based transform may be a 2-dimensional separable graph-based transform kernel generated based on a combination of a plurality of 1-dimensional graph-based transforms.

The decoder may decode the transform coefficient for the target block (S1220).

Meanwhile, the decoder may obtain edge information (S1230). Here, the edge information may be derived from neighboring block information or preset edge information may be retrieved. Alternatively, the decoder may extract edge information from a bit stream.

The decoder may generate a graph based on the edge information (S1240) and may obtain an inverse-transform kernel for each row or column based on at least one of the graph or the transform index (S1240).

Here, the inverse-transform kernel for each row or column may be a kernel generated based on at least one of boundary information, a prediction mode, and a size of a transform unit.

The boundary information may refer to information for expressing characteristics of a signal in a boundary of a block. For example, the boundary information may include at least one of an edge weight, the number of self-loops, and a self-loop weight.

The edge weight may be divided into an edge weight of a left boundary and an edge weight of a right boundary, and the self-loop weight may also be divided into a self-loop weight of the left boundary and a self-loop weight of the right boundary.

The edge weight or the self-loop weight may be expressed three values of a strong weight, no weight, and a weak weight. For example, a strong weight may be represented by 2, no weight may be represented by 1, and a weak weight may be represented by 0. However, the present invention is not limited thereto, and a weight value may be represented by at least one value.

The decoder may perform inverse transform using an inverse transform kernel for each row or column (S1250).

Meanwhile, when the edge information is derived from neighboring block information or preset edge information is retrieved, transform index parsing and transform coefficient decoding may be performed in parallel. However, in the case of parsing the edge information, it may be sequentially performed with transform index parsing and transform coefficient decoding process.

In the present invention, since transform for each row and/or column is generated using edge information and used, coding may be effectively performed, compared with a case where only DCT or DST is applied to every row and/or column.

Further, in the present invention, since edge information is derived or extracted and transform is determined using the edge information, compression efficiency may be improved.

The present invention also provides a method of selecting one of various schemes to create a transform kernel using edge information, and additional information transmission may be required.

FIGS. 13, 14A, and 14B illustrate graph examples for explaining edge information and weight information in a video signal according to embodiments to which the present invention is applied.

An image is composed of several objects or backgrounds, and edges exist between objects and backgrounds. Edge information may be extracted by appropriately applying various algorithms known in the documents (e.g., Sobel operator, Prewitt operator, Canny edge detector, etc.). Assuming that edge information of an image is available and transform is applied by dividing the image into quadrangular blocks (e.g., 4×4, 8×8, 16×16, 32×32, 16×8, 4×8, etc.), an example graph of a block thereof may be illustrated as in FIG. 13.

In FIG. 13, a vertex indicates a pixel, and the edge information may indicate disconnection between pixels. A value 0 or 1 may be given as a weight to a graph connection in a horizontal (vertical) direction or in a row (column) direction as illustrated in FIG. 14A (or FIG. 14B) from the edge information of FIG. 13. The value 0 indicates a case where association between two pixels is small or a change in pixel values is large. This may occur when objects to which two pixels belong are different.

In the case of a 4-connected graph as illustrated in FIGS. 13, 14A, and 14B, a neighboring diagonal connection or a connection to a row or a column away by 2 hops or more is not present, a 1-dimension separable transform may be applied in each of the row direction and the column direction.

Since the corresponding 1-dimensional fine graph may be different for each row and column as illustrated in FIGS. 14A and 14B, different transforms may be applied to each row and column. For example, in FIG. 15, a transform kernel regarding a 1-dimensional line graph indicated by the square box A may be applied to a second row.

FIG. 15 is a view illustrating application of different transform kernels to each row or column in a 1-dimensional line graph according to an embodiment to which the present invention is applied.

Referring to FIG. 15, it may be seen that, in the 1-dimensional line graph A of the second row, an edge value between a fifth pixel and a sixth pixel is 0. Accordingly, the 1-dimensional line graph A of the second row may be divided into two regions (or segments) based on the edge, and a corresponding GBT kernel may be obtained by a combination of 5×5 DCT type-2 coefficients and 3×3 DCT type-2 coefficients.

Specifically, when a 5×5 DCT type-2 matrix and a 3×3 DCT type-2 matrix are denoted as $T_{5\times5}$ and $T_{3\times3}$, respectively, and a 5×3 zero matrix and a 5×5 zero matrix are represented by $O_{5\times3}$ and $O_{3\times5}$, respectively, a corresponding 8×8 GBT kernel may be determined by Equation (7) and Equation (8). In Equations (7) and (8), $r_i^N$ indicates a 1×8 row vector.

$$\begin{bmatrix} r_1^5 \\ r_2^5 \\ \vdots \\ r_5^5 \end{bmatrix} = [T_{5\times5} O_{5\times3}], \begin{bmatrix} r_1^3 \\ r_2^3 \\ r_3^3 \end{bmatrix} = [O_{3\times5} T_{3\times3}] \quad \text{[Equation 7]}$$

$$\begin{bmatrix} r_1^8 \\ r_2^8 \\ \vdots \\ r_8^8 \end{bmatrix} = \text{Permutation of } \begin{bmatrix} r_1^5 \\ \vdots \\ r_5^5 \\ r_1^3 \\ r_2^3 \\ r_3^3 \end{bmatrix} \quad \text{[Equation 8]}$$

Referring to Equations 7 and 8, the GBT kernel $r_l^8$ (l=1~8) may have different values depending on in which order $r_i^5$ (i=1~5) and $r_j^3$ (j=1, 2, 3) are arranged. Hereinafter, in the present invention, a method of determining in which order the vectors within the segments divided by the edges are to be arranged will be described.

Coefficients for a kth row vector in the N×N DCT type-2 kernel may be determined as expressed by Equation 9 below.

$$\cos\left(j+\frac{1}{2}\right)k\frac{\pi}{N} \quad (j=0, 1, \ldots, N-1, k=0, 1, \ldots, N-1) \quad \text{[Equation 9]}$$

Here, the kth row vector may be considered as a basis vector for extracting a signal component having an angular frequency of $$k\frac{\pi}{N}.$$

Generally, in an image codec, transform coefficient values in a high-frequency region are converted into zero through transformation and quantization using qualities that most of the energy is concentrated on a low-frequency region of image data. Data compression is then performed through a technique such as run-length coding, or the like. Thus, in the present invention, row vectors are arranged in ascending order based on the angular frequency value of $$k\frac{\pi}{N}$$

so that the low frequency component is arranged on the front.

In another embodiment of the present invention, when angular frequency values of two row vectors are the same, the row vectors may be arranged by applying the following references.

In a first example, priority may be given to a line segment disposed on the left of the graph. For example, in the case of the 1-dimensional line graph in the portion A of FIG. 15, a row vector for (0/5) π may be disposed first, relative to a row vector for (0/3)π.

In a second example, in the angular frequency of $$k\frac{\pi}{N},$$

priority may be given to a row vector having a larger N value may be given. For example, a row vector for (0/5)π may be first disposed, compared with a row vector for (0/3)π.

Alternatively, a row vector having a smaller N value may be given priority. For example; the row vector for (0/3)π may be disposed before the row vector for (0/5)π.

In a third example, row vectors belonging to the same segment may be arranged as far as possible. For example, when one of (1/3)π and (3/9)π is selected first, if a row vector for (2/9)π is disposed immediately before, (1/3)π may be selected first. However, if the immediately disposed row vector belongs to a segment different from the row vector to be currently arranged, the references of the first or second example above may be applied.

Alternatively, row vectors belonging to the same segment may be arranged to be as close as possible to each other.

The references listed above may be applied separately or in combination.

In an embodiment, when permutation is performed with row vectors for a transform kernel other than DCT type-2, an angular frequency corresponding to a transform equation should be used. For example, in the case of DST type-7 transform, the coefficients of the kth row vector may be determined as expressed by Equation 10.

$$\sin\frac{(j+1)(k+1)\pi}{N+1}, \quad \text{[Equation 10]}$$

$$(j=0,1,\ldots,N-1, k=0,1,\ldots,N-1)$$

Here, $$\frac{k+1}{N+1}\pi$$

may be used as an angular frequency value for the DST type-7.

When $r_i^5$ (i=1~5) and $r_j^3$ (j=1, 2, 3) in Equation (7) are arranged based on the above reference, Equation 11 below may be obtained.

$$\begin{bmatrix} r_1^8 \\ r_2^8 \\ \vdots \\ r_8^8 \end{bmatrix} = \begin{bmatrix} r_1^5 \\ r_1^3 \\ r_2^5 \\ r_2^3 \\ r_3^5 \\ r_4^5 \\ r_3^3 \\ r_5^5 \end{bmatrix}, \frac{0}{5}\pi \le \frac{0}{3}\pi \le \frac{1}{5}\pi \le \frac{1}{3}\pi \le \frac{2}{5}\pi \le \frac{3}{5}\pi \le \frac{2}{3}\pi \le \frac{4}{5}\pi \quad \text{[Equation 11]}$$

Here, an angular frequency for $r_i^N$ is $$\frac{i-1}{N}\pi.$$

When the angular frequency is at the same rate, a row vector for the left segment is given a higher priority in a one-dimensional line graph.

FIG. 16 is a view illustrating a method of determining an optimal transform kernel based on at least one of the number of self-bops, a self-loop weight, and an edge weight according to an embodiment to which the present invention is applied.

The DST type-7 transform may be obtained from a graph in which a self-loop is added to a left vertex of the He graph. That is, if a transform kernel is generated for a graph in which a self-loop is added to the left vertex of the line graph, a 4×4 DST type-7 transform may be obtained Referring to FIG. 16, it may be seen that a self-loop is added to the leftmost vertex in the graph of FIG. 15. Here, for a 1-dimensional fine graph B represented by the box, a graph-based transform kernel including 5×5 DST type-7 transform coefficients and 3×3 DCT type-2 transform coefficients may be obtained.

As described above in Equation 7 and Equation 8, when row vectors of a matrix formed by combining the 5×5 DST type-7 transform kernel and a zero matrix and row vectors of a matrix formed by combining the zero matrix and the 3×3 DCT type-2 transform kernel are arranged according to sizes of angular frequencies, the entire 8×8 GBT kernel may be obtained.

Here, using $$\frac{k+1}{N+1}\pi$$

as an angular frequency value for the DST type-7 transform and using $$k\frac{\pi}{N}$$

as an angular frequency value for the DCT type-2 transform, the row vectors may be arranged as expressed by Equation 11.

As illustrated in FIG. 16, according to positions of the self-loop, a weight value for the self-loop, and the number of self-loops, transform types other than the DST type-7 transform may be obtained. How the self-loop may be connected optimally may be determined based on a coding mode. For example, the coding mode may include at least one of an intra-angular prediction mode and a transform unit size.

Regarding the transforms, when the row vectors are arranged by comparing angular frequencies, a final transform kernel for one row or column may be obtained.

In another embodiment to which the present invention is applied, edge information on an image may be analyzed by extracting an original image or may be extracted by analyzing a residual image.

In an embodiment, after the encoder obtains edge information, when the encoder transmits the edge information to the decoder, a unit for sending the edge information may be set in various manners. For example, the edge information may be transmitted in units of frames or slices or may be transmitted in block units (e.g., CU, PU, TU, etc.). Further, whether to apply GBT may be turned on/off using flag information at each transmission level, based on which whether to transmit edge information may be determined to reduce a transmission amount of the edge information.

In another example, in the case of an inter prediction block, edge information may be derived from a reference picture. Since a reference block indicated by a motion vector is often very similar to a current block, edge information may be derived by applying an edge detection algorithm to the reference block, and thereafter, a corresponding graph may be obtained to obtain GBT of the current block. Here, the reference picture may be a reconstructed picture or residual data for the reference picture. Here, the residual data may be separately stored in a process of reconstructing the corresponding reference picture.

In another example, when an image is divided into a plurality of objects and coded, a graph indicating connection or disconnection between pixels is generated from positional information, boundary information, and the like, regarding each object, and thereafter, a transform kernel for each block may be obtained through the aforementioned GBT generation process. When an image is divided into several regions or objects by a segmentation algorithm, or the like, a graph may be constructed in a manner of disconnecting a corresponding connection between the pixels that belong to different objects.

In another example, when an image is coded in units of CU or PU, a boundary of the CU or PU may approximately reflect edge characteristics of the image. Accordingly, when a boundary of a CU or a PU is included in the TU, the GBT generation method described above may be applied after a graph reflecting the boundary is constructed. For example, when the boundary of a CU or a PU is included in the TU, connection to a portion which meets the boundary may be disconnected.

In another example, flag information indicating whether to apply the GBT generated as described above at the various levels (for example, frame, slice, CU, PU, TU, etc.) may be defined and an optimal transform may be selected in at least one level. In the encoder, both the normal transform (e.g., DCT type-2, DST type-7, etc.) and the GBT (graph-based transform) are applied through a rate-distortion (RD) optimization process, and transform incurring smallest cost may be designated through a flag or an index.

FIG. 17 is a flowchart illustrating a process of rearranging transform vectors constituting a transform kernel based on edge information according to an embodiment to which the present invention is applied.

First, the encoder may check edge information regarding a target unit (S1710).

The encoder may generate a line graph based on the edge information (S1720).

The encoder may arrange transform vectors for each segment of the line graph (S1730). Here, the transform vectors for each segment may refer to transform vectors corresponding to two or more line graph segments divided based on the edge information. At least two transform types may be applied to the transform vectors in the two or more line graph segments.

The encoder may obtain a transform kernel by rearranging transform vectors for each segment according to a predetermined condition (S1740).

Here, the predetermined condition may be applied to various embodiments. For example, when a left segment among the two or more line graph segments is referred to as a first segment and a right segment is referred to as a second segment based on the edge information, the transform vectors in the first segment and the second segment may be arranged in ascending order based on angular frequency values.

In another example, when the angular frequency values of the transform vectors in the first segment and the second segment are the same, the line graph segment located on the left may be given priority.

In another example, when the angular frequency values of the transform vectors in the first segment and the second segment are the same, a wider line graph segment may be given priority.

In another example, when the angular frequency values of the transform vectors in the first segment and the second segment are the same, the transform vectors in the same segment may be arranged to become away from each other.

The encoder may perform transform on a target unit using a transform kernel (S1750).

Meanwhile, the encoder may encode a transform index corresponding to at least one of transform for a target unit, transform for a line graph, and transform for a segment, and transmit the same.

FIG. 18 is a flowchart illustrating a process of decoding a video signal through a process of rearranging transform vectors according to an embodiment to which the present invention is applied.

First, the decoder may parse a transform index from a video signal (S1810). Here, the transform index may correspond to at least one of transform for a target unit, transform for a line graph, or transform for a segment.

The decoder may arrange transform vectors for each segment of the line graph based on a transform type corresponding to the transform index (S1820).

The decoder may obtain a transform kernel by rearranging the transform vectors for each segment of the line graph according to a predetermined condition (S1830).

Here, the predetermined condition may be applied to various embodiments described above. For example, when a left segment among the two or more line graph segments is referred to as a first segment and a right segment is referred to as a second segment based on the edge information, the transform vectors in the first segment and the second segment may be arranged in ascending order based on angular frequency values.

The decoder may perform inverse-transform for the target unit using the transform kernel (S1840). Here, the transform kernel may be composed of a combination of transform vectors present in the two or more line graph segments divided based on the edge information, and at least two transform types may be applied to the transform vectors present in the two or more line graph segments.

In the present disclosure, a line graph having a total of eight vertices has been described, but the present invention is not limited thereto. For example, the line graph may extend to line graphs having 16, 32, 64, or more vertices.

In the embodiments of the present invention, the line graph may be modeled for a prediction residual signal generated through an intra-prediction or an inter-prediction, and the optimal transform kernel may be selected adaptively according to the property of the prediction residual signal and used.

In the embodiments of the present invention, the transform kernel generated through each line graph may be selectively applied to a horizontal direction and a vertical direction using various combinations, and this may be signaled through additional information.

As described above, the embodiments explained in the present invention may be implemented and performed on a processor, a micro-processor, a controller or a chip. For example, functional modules explained in FIG. 1, FIG. 2, FIG. 8, FIG. 9 and FIG. 10 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of encoding a video signal using a graph-based transform, the method comprising:
checking edge information for a target unit;
generating a line graph based on the edge information;
generating a transform kernel for each of rows and columns of the target unit based on the line graph;
performing a transform for the target unit using the transform kernel; and
rearranging the transform vectors constituting the transform kernel according to a predetermined condition,
wherein the transform kernel includes a combination of transform vectors present in two or more line graph segments divided based on the edge information,
wherein at least two transform types are applied to the transform vectors present in the two or more line graph segments, and
wherein, when a left segment among the two or more line graph segments based on the edge information is a first segment and a right segment among the two or more line graph segments is a second segment, transform vectors within the first segment and the second segment are arranged in ascending order based on an angular frequency value.

2. The method of claim 1, wherein
when angular frequency values of the transform vectors within the first segment and the second segment are the same, priority is given to the line graph segment positioned on the left.

3. The method of claim 1, wherein
when angular frequency values of the transform vectors within the first segment and the second segment are the same, priority is given to a wider line graph segment.

4. The method of claim 1, wherein
when angular frequency values of the transform vectors within the first segment and the second segment are the same, the transform vectors within the same segment are arranged to become away from each other.

5. The method of claim 1, further comprising:
encoding a transform index corresponding to the transform kernel.

6. A method of decoding a video signal using a graph-based transform, the method comprising:
parsing a transform index from the video signal;
generating a line graph based on edge information regarding a target unit;
arranging transform vectors for each segment of the line graph based on a transform type corresponding to the transform index;
obtaining a transform kernel by rearranging the transform vectors for each segment of the line graph according to a predetermined condition; and
performing an inverse-transform for the target unit based on the transform kernel,
wherein, when a left segment among the two or more line graph segments based on the edge information is a first segment and a right segment among the two or more line graph segments is a second segment, transform vectors within the first segment and the second segment are arranged in ascending order based on an angular frequency value.

7. The method of claim 6, wherein
the transform kernel includes a combination of transform vectors present in two or more line graph segments divided based on the edge information and
at least two transform types are applied to the transform vectors present in the two or more line graph segments.

8. The method of claim 6, wherein
when the angular frequency values of the transform vectors within the first segment and the second segment are the same, priority is given to the line graph segment positioned on the left.

9. The method of claim 6, wherein
when the angular frequency values of the transform vectors within the first segment and the second segment are the same, priority is given to a wider line graph segment.

10. The method of claim 6, wherein
when the angular frequency values of the transform vectors within the first segment and the second segment are the same, the transform vectors within the same segment are arranged to become away from each other.

11. A device for encoding a video signal using a graph-based transform, comprising:
a processor configured to:
check edge information for a target unit and generate a line graph based on the edge information;
generate a transform kernel for each of rows and columns of the target unit based on the line graph;
perform a transform for the target unit using the transform kernel; and
rearrange the transform vectors constituting the transform kernel according to a predetermined condition,
wherein the transform kernel includes a combination of transform vectors present in two or more line graph segments divided based on the edge information and at least two transform types are applied to the transform vectors present in the two or more line graph segments, and
wherein, when a left segment among the two or more line graph segments based on the edge information is a first segment and a right segment among the two or more line graph segments is a second segment, transform vectors within the first segment and the second segment are arranged in ascending order based on an angular frequency value.

12. A device for decoding a video signal using a graph-based transform, comprising:
a processor configured to:
parse a transform index from the video signal;
generate a line graph based on edge information regarding a target unit;
arrange transform vectors for each segment of the line graph based on a transform type corresponding to the transform index;
obtain a transform kernel by rearranging the transform vectors for each segment of the line graph according to a predetermined condition; and
perform an inverse-transform for the target unit based on the transform kernel,
wherein, when a left segment among the two or more line graph segments based on the edge information is a first segment and a right segment among the two or more line graph segments is a second segment, transform vectors within the first segment and the second segment are arranged in ascending order based on an angular frequency value.

* * * * *